US007586987B2

(12) United States Patent
Vorenkamp et al.

(10) Patent No.: US 7,586,987 B2
(45) Date of Patent: Sep. 8, 2009

(54) HIGH SPEED DATA LINK WITH TRANSMITTER EQUALIZATION AND RECEIVER EQUALIZATION

(75) Inventors: Pieter Vorenkamp, Laguna Niguel, CA (US); Aaron Buchwald, Newport Coast, CA (US)

(73) Assignee: Broadcom Corporation, Irvine, CA (US)

( * ) Notice: Subject to any disclaimer, the term of this patent is extended or adjusted under 35 U.S.C. 154(b) by 576 days.

(21) Appl. No.: 10/680,490

(22) Filed: Oct. 8, 2003

(65) Prior Publication Data

US 2004/0071219 A1 Apr. 15, 2004

Related U.S. Application Data

(60) Provisional application No. 60/416,578, filed on Oct. 8, 2002.

(51) Int. Cl.
*H04B 3/00* (2006.01)
*H04L 25/03* (2006.01)

(52) U.S. Cl. ....................................... 375/257; 375/296

(58) Field of Classification Search ................. 375/222, 375/257, 259, 285, 295, 296; 333/28 R, 333/17.2; 379/93.01
See application file for complete search history.

(56) References Cited

U.S. PATENT DOCUMENTS 3,604,250 A * 9/1971 Grandia ....................... 73/609
4,275,358 A * 6/1981 Winget ....................... 330/109
5,337,025 A * 8/1994 Polhemus ................. 333/28 R
5,579,336 A * 11/1996 Fitzgerald et al. ........... 375/257
5,608,757 A * 3/1997 Smith et al. ................. 375/257
5,694,439 A * 12/1997 Doyle et al. ................ 375/350
6,212,229 B1 * 4/2001 Salinger ..................... 375/224
6,263,017 B1 7/2001 Miller ........................ 375/222
6,525,601 B2 * 2/2003 Gilbert ....................... 327/560
2004/0120419 A1 * 6/2004 Gauthier et al. ............. 375/285

OTHER PUBLICATIONS

International Search Report for PCT Appl. No. PCT/US03/31853, filed Oct. 8, 2003, 7 pages (mailed: Mar. 25, 2004).

* cited by examiner

*Primary Examiner*—Betsy L Deppe
(74) *Attorney, Agent, or Firm*—Sterne, Kessler, Goldstein & Fox P.L.L.C.

(57) ABSTRACT

A high speed data link includes transmitter equalization and (passive) receiver equalization to compensate for frequency distortion of the data link. In one embodiment, the transmitter equalization is performed with a de-emphasis circuit. The transmitter de-emphasis circuit pre-distorts an input signal to compensate for at least some of the frequency distortion in the data caused by the transmission line. The (passive) receive equalization circuit further compensates for the frequency distortion at the output of the transmission line to flatten the amplitude response of the output signal, and thereby reduce inter-symbol interference, improve media reach and improve the bit error rate (BER).

12 Claims, 15 Drawing Sheets

200

NO PRE-EMPHASIS

PRE-EMPHASIS ON

EXTERNAL EQUALIZER

PRE-EMPHASIS

HIGH SPEED DATA LINK WITH TRANSMITTER EQUALIZATION AND RECEIVER EQUALIZATION

CROSS-REFERENCE TO RELATED APPLICATIONS

This application claims the benefit of U.S. Provisional Application No. 60416,578, filed on Oct. 8, 2002, which is herein incorporated by reference in its entirety.

BACKGROUND OF THE INVENTION

1. Field of the Invention

The present invention generally relates to high speed data links, and more particularly to high speed data links that utilize transmitter de-emphasis and receiver equalization.

2. Background Art

High speed data links transmit data from one location to another over transmission lines. These data links can include serial data links that receive data in a parallel format and convert the data to a serial format for high speed transmission. SERDES (SERializer DESerializer) data links can be part of a backplane in a communications system, that is well known to those skilled in the art (e.g. Tyco Backplane 30-inch trace).

In high speed data links, there is a trade-off between the length of the data link and the bit error rate (BER). Generally, assuming a constant data rate, the BER increases with the length of the data link. This occurs because the transmission line in the data link causes frequency distortion that contributes to inter-symbol interference. Furthermore, the BER also generally increases as the data rate increases.

It is desirable to increase the physical length of the data link and operate the data link at high data rates, while minimizing BER.

BRIEF SUMMARY OF THE INVENTION

Further features and advantages of the present invention, as well as the structure and operation of various embodiments of the present invention, are described in detail below with reference to the accompanying drawings.

A high speed data link includes a transmitter equalization circuit and a (passive) receiver equalization circuit to compensate for frequency distortion of the data link. In one embodiment, the transmitter equalization circuit is a de-emphasis circuit. The transmitter de-emphasis circuit pre-distorts an input signal to compensate for at least some of the frequency distortion in the data that is caused by the transmission line in the data link. The (passive) equalization circuit incorporated in the Receiver further compensates for the frequency distortion at the output of the transmission line to flatten the amplitude response of the output signal, and thereby improve the bit error rate (BER).

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

FIGS. 6, 6-1, 6-2 illustrate the eye diagram at the receiver comparing no de-emphasis vs with de-emphasis, and an external equalizer. The improvement in bit error rate is apparent using the de-emphasis.

FIGS. 7 and 7-1 illustrate the eye diagrams when using de-emphasis verses a passive receiver equalizer.

DETAILED DESCRIPTION OF THE INVENTION

Figure 1:
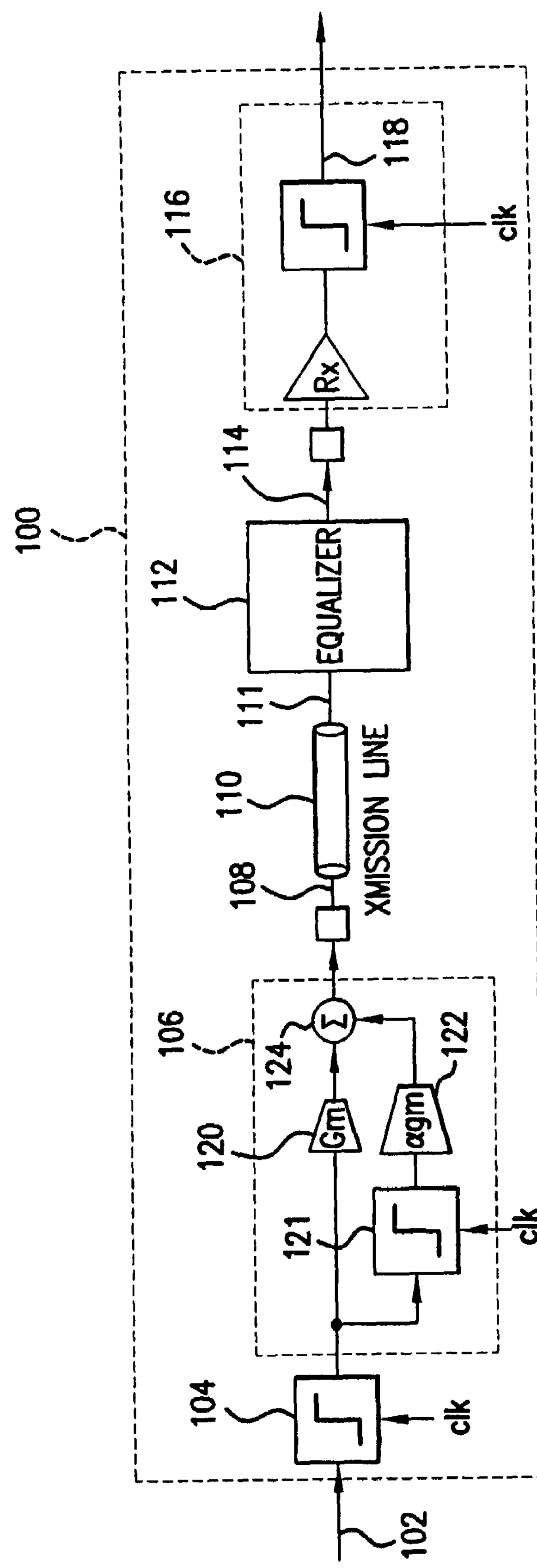
FIG. 1 illustrates a high speed data link 100 that includes both transmitter de-emphasis and (passive) receiver equalization according to embodiments of the present invention.

FIG. 1 illustrates a high speed data link 100 that includes both transmitter de-emphasis and (passive) receiver equalization according to embodiments of the present invention. The High speed data link 100 sends transmit data 102 at a first location to a second location over a transmission line 110 that is output as receive data 118. The transmission line 110 can be optical fiber, coaxial cable, twisted pair, or any other type of transmission media.

The high speed data link 100 includes a data-synchronization circuit 104, a transmitter de-emphasis circuit 106, a transmission line 110, a passive receiver equalizer 112, and a receive slicer 116.

The high speed data link 100 can operate at very high data rates, e.g. 3.1 Gbits/sec. At these high data rates, the channel characteristics and distortion change with frequency. In other words, the amplitude and phase characteristics of the transmission line 110 can vary with frequency, causing frequency distortion and inter-symbol interference.

Transmitter de-emphasis circuit 106 and passive receiver equalization circuit 112 are added to compensate for frequency distortion in the transmission line 110. The transmitter de-emphasis circuit 106 pre-distorts the input signal 102 to compensate for at least some of the frequency distortion caused by the transmission line 110, and outputs a pre-distorted input signal 108. The pre-distorted input signal 108 is launched into the transmission line 110 and is received as a received signal 111. The frequency distortion caused by the transmission line 110 is offset by the transmitter de-emphasis circuit 106 so that the received signal 111 has less distortion than it otherwise would after traveling through the transmission line 110. The transmitter de-emphasis circuit 106 provides the transmitter with equalization. However, other circuits could be used to provide transmitter equalization, as will be understood by those skilled in the art. These other circuits and configurations are within the scope and spirit of the present invention.

The passive equalization circuit 112 receives the received signal 111 from the transmission line 110 and further compensates for the frequency distortion of the transmission line 110, to produce an output signal 114. After amplification, the receive slicer 116 makes a high/low decision on the received signal 114 to generate the output signal 118. The transmit synchronization circuit 104 provides a similar function on the transmit side of the transmission line 110. The present invention is not limited to the passive equalizer circuit 112. Other equalization circuits could be used including an active equalizer circuit.

In one embodiment, the transmitter de-emphasis circuit 106 includes a transconductance device 120, a slicer 121, a variable transconductance device 122, and a summer 124. The transconductance device 120 provides an output current proportional to the output signal provided by the synchronization circuit 104. The variable transconductance device 122 provides an output current proportional to the output signal provided by a slicer or the second synchronization circuit 121 and proportional to the variable Alpha. The output current of the first transconductor 120 and the output current of the second variable transconductor 122 are combined and converted to a voltage by the summer 124 before driving the transmission line 110. The second synchronization circuit 121 provides an additional delay for the signal provides to the second transconductor 122. The gain (Alpha) of the second transconductor 122 can be programmed. As a result, the de-emphasis circuit decreases the amplitude of the low frequency signal components of the input signal, while the high frequency components are unchanged. The invention is not limited to the configuration that is shown for the transmitter de-emphasis circuit 106. Based on the discussion herein, those skilled in the art will recognize techniques and configurations to decrease the amplitude of the low frequency signal components relative to the high frequency signal components in the input signal. These other configurations are within the scope and spirit of the present invention.

The transmission line 110 typically has an amplitude response resembles a low-pass characteristic. Therefore, the de-emphasis circuit 106 is configured to have a gain response that increases with frequency over the bandwidth of the input signal 102 to compensate for the increased loss over frequency of the transmission line 110. Therefore, the received signal 111 at the output of the transmission line 110 should have a relatively flat amplitude response verses frequency.

Figure 2:
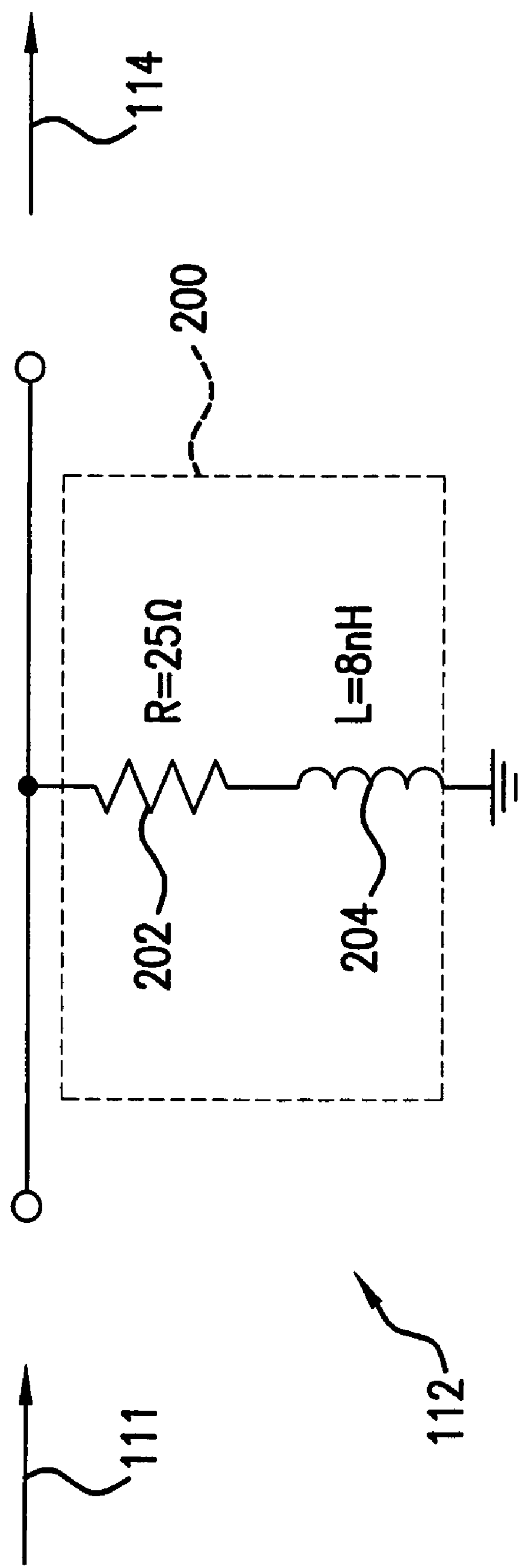
FIG. 2 further illustrates one embodiment of the passive equalizer 112 as an inductive peaking circuit 200 that is shunt to ground.

FIG. 2 further illustrates one embodiment of the passive equalizer 112 as an inductive peaking circuit 200 that is shunt to ground. The inductive peaking circuit 200 includes a resistor 202 and an inductor 204 that are connected in series with each other, where the inductor 204 is connected to ground. Therefore, the peaking circuit 200 is an impedance to ground that increases with frequency due to the inductor 204. The peaking circuit 200 shunts more signal energy at lower frequencies in the output signal 111 to ground relative to the higher frequencies in the output signal 111. Since the transmission line 110 typically has the opposite amplitude response, the amplitude response of the signal 114 is flattened over frequency. Based on the discussion given herein, those skilled in the art will recognize techniques and configurations for implementing the peaking circuit 200 and the equalizer circuit 112. These other configurations are within the scope and spirit of the present invention.

A flatter amplitude response over frequency reduces intersymbol interference and improves the bit error rate (BER).

FIG. 3A-3F illustrate various configurations for the peaking circuit 200 in differential configurations. In other words, the transmission line 110 can be differential and therefore the peaking circuit 200 is also differential. All components values used in these drawings are for illustrative purpose only, and are not meant to limit the invention in any way.

Figure 3A:
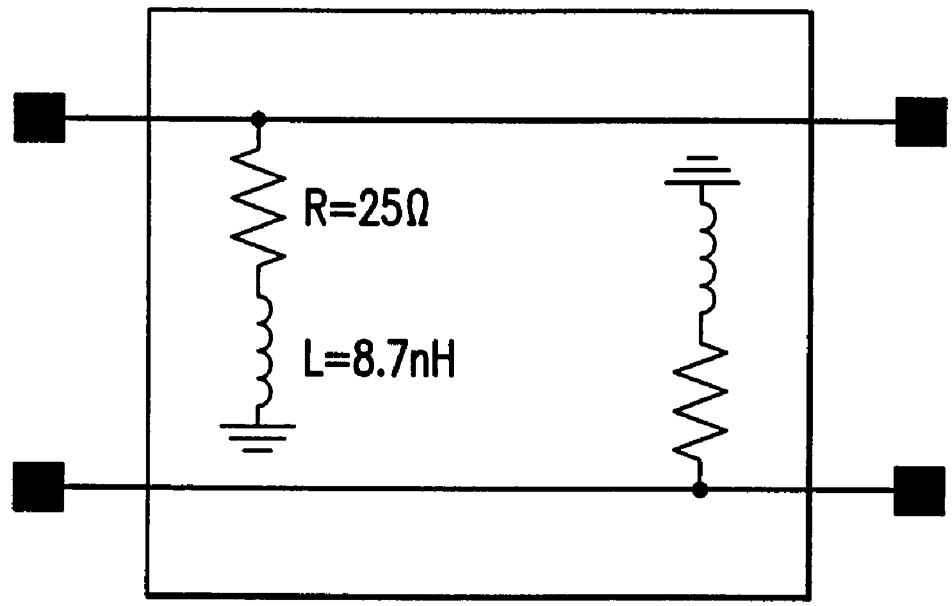
FIGS. 3A-3F illustrate various configurations for the peaking circuit 200 in differential configurations.
Figure 3B:
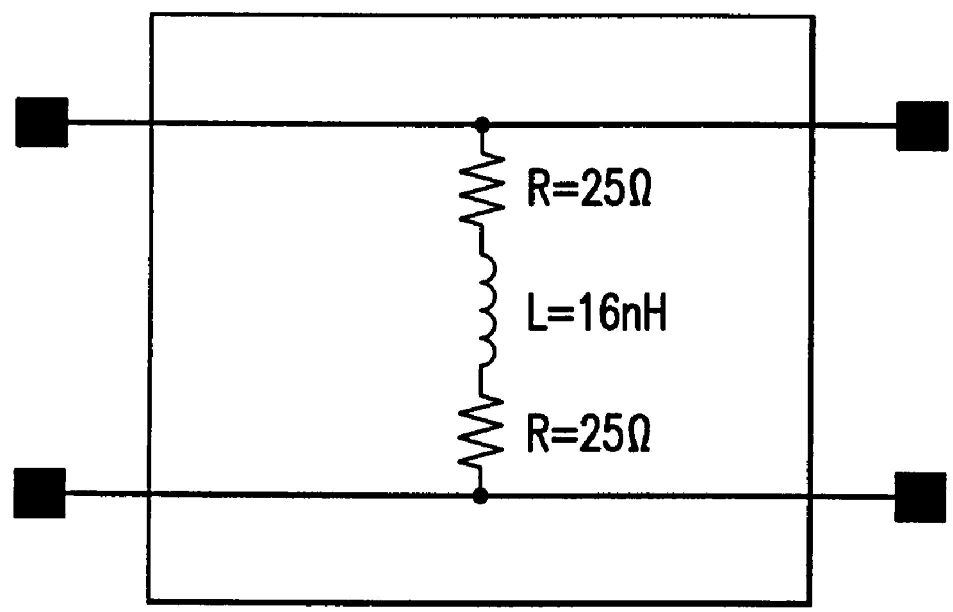
Figure 3E:
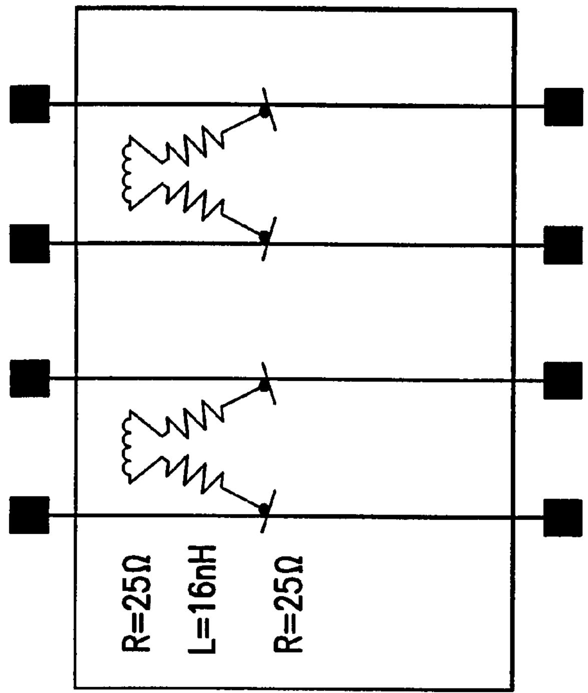
Figure 3F:
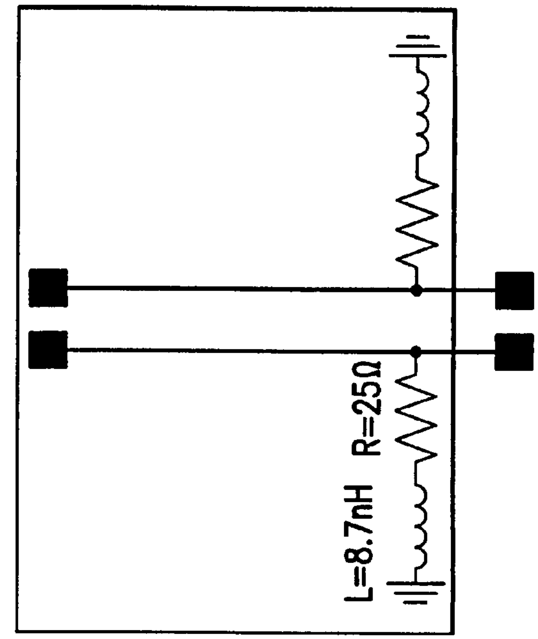
Figure 3C:
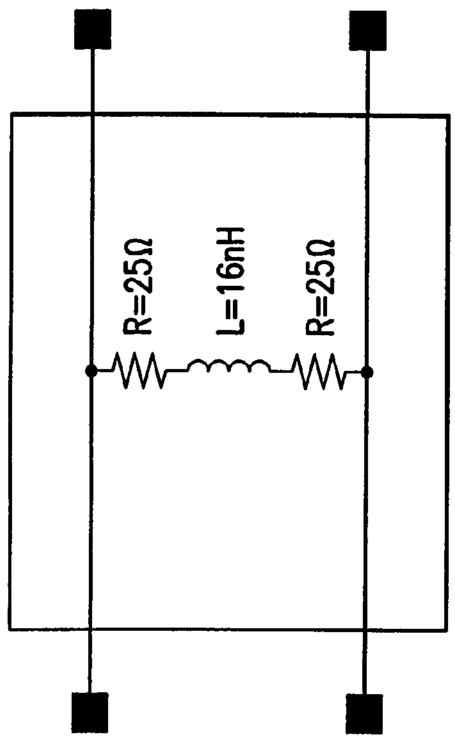
Figure 3D:
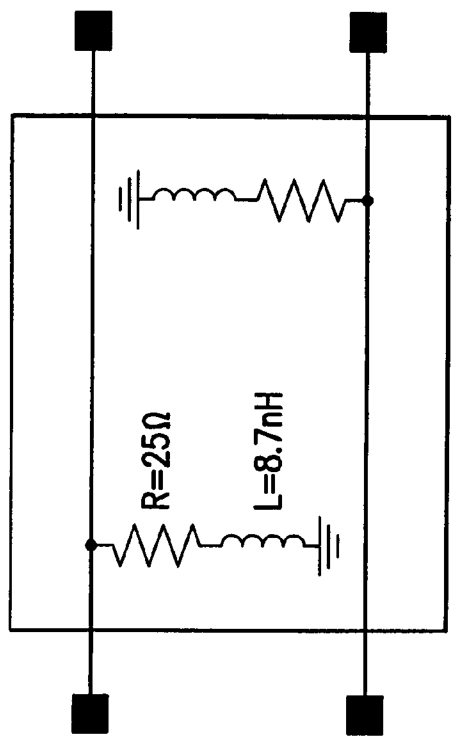

In FIGS. 3A and 3D, the resistor 202 and the inductor 204 of the peaking circuit 200 are attached to each line of the differential transmission line, between each differential line and ground.

In FIGS. 3B and 3C, the resistor 202 and inductor 204 and are connected between the two components of the differential transmission line, and the resistor is split into two resistors.

In FIG. 3E, the receive side of the transmission line is shown being bi-directional and differential. In FIG. 3F, the transmit side of the transmission line is shown as being differential.

Figure 4A:
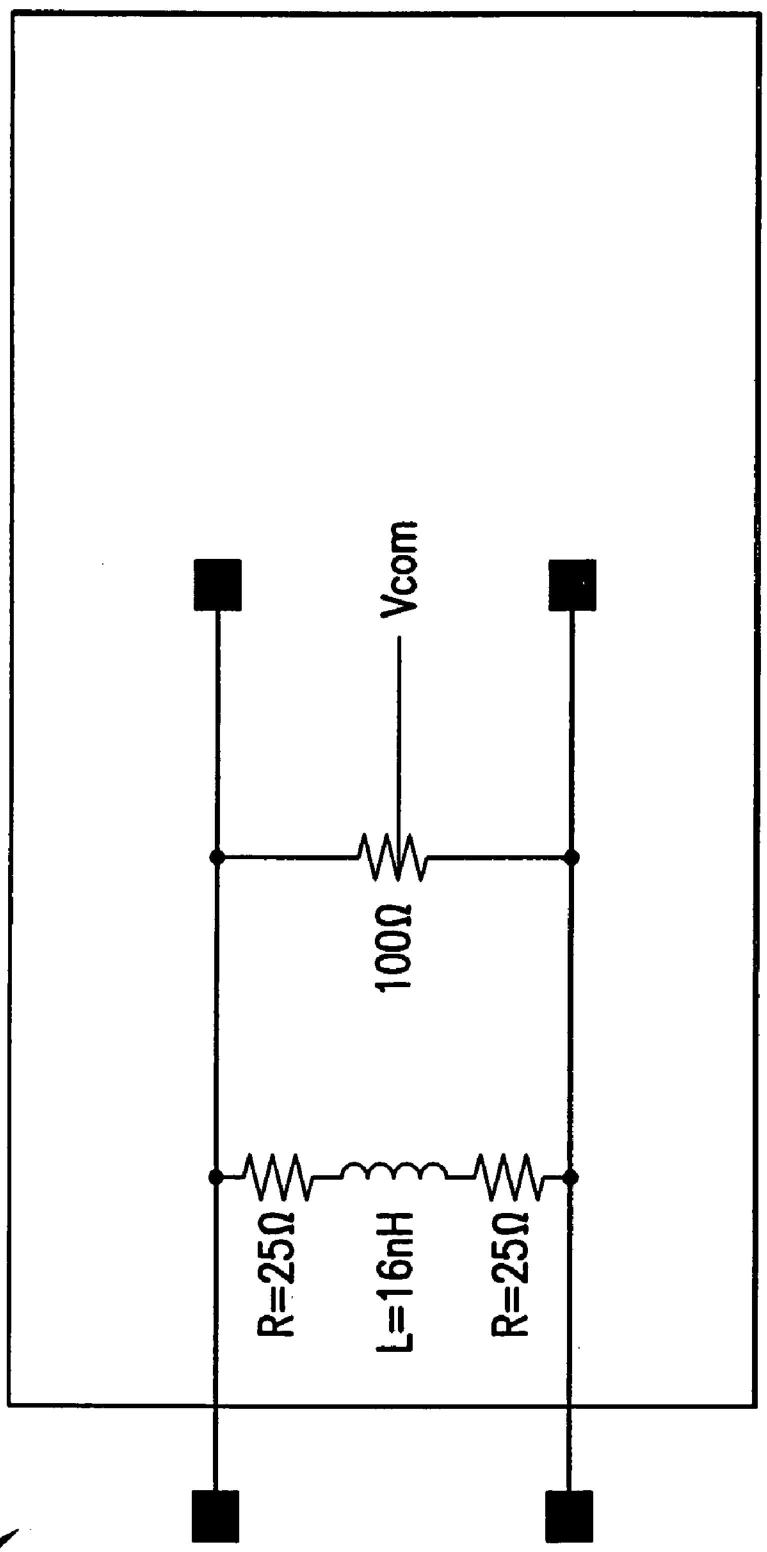
FIGS. 4A-4C illustrate various differential terminations for the peaking circuit 200.
Figure 4B:
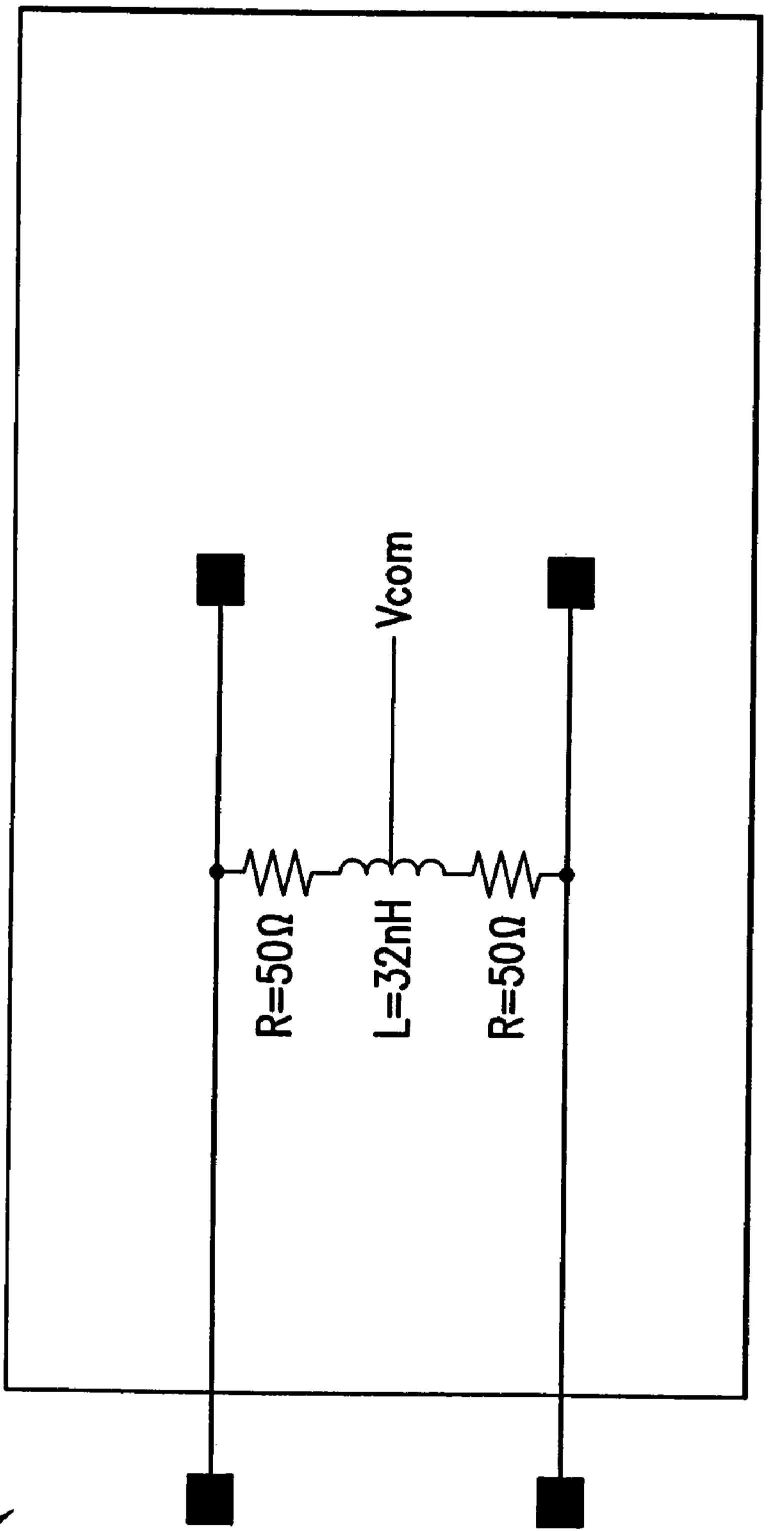
Figure 4C:
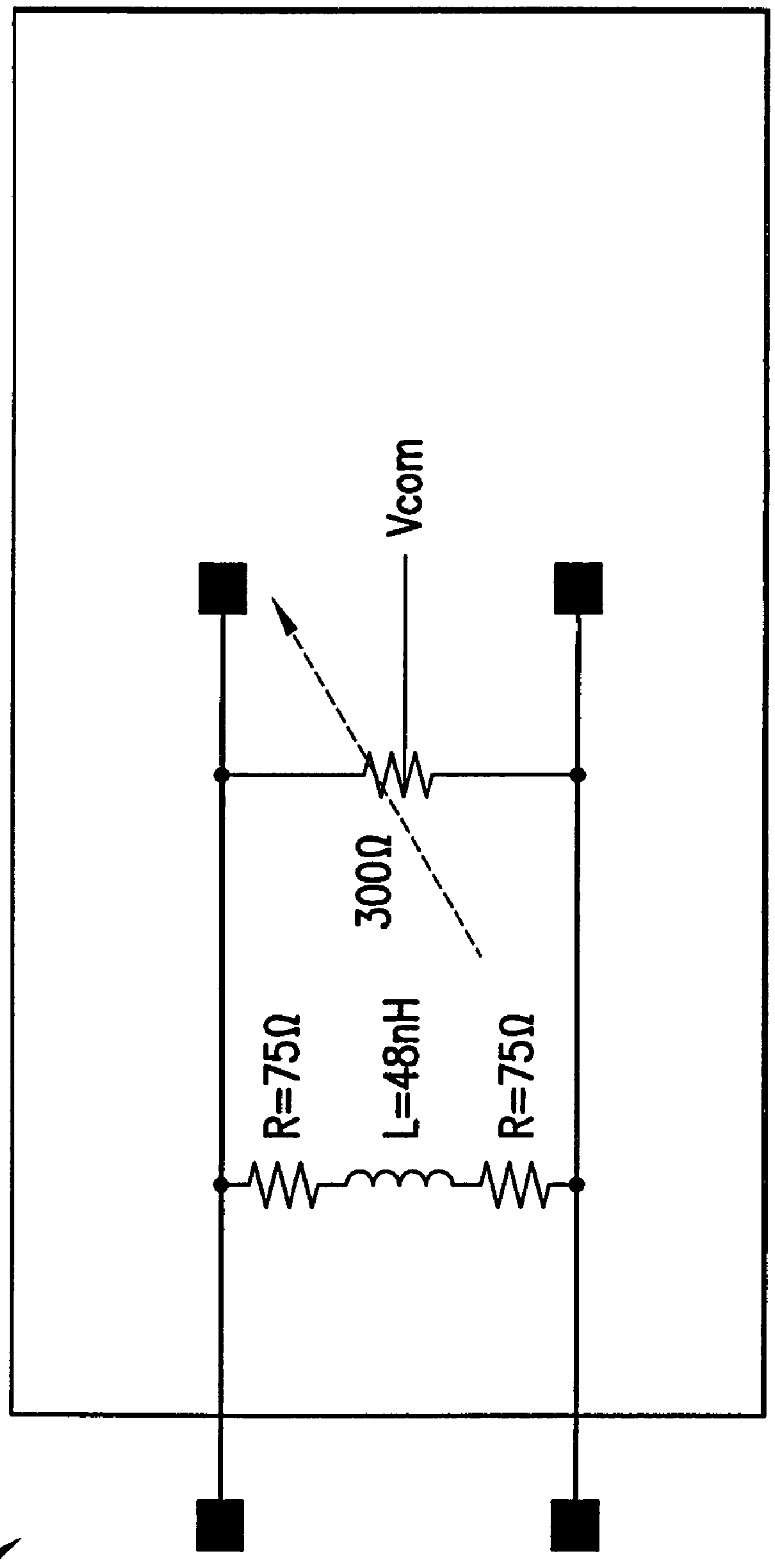

FIGS. 4A-4C illustrate various differential terminations for the peaking circuit 200. FIG. 4A illustrates a 50 ohm differential internal termination. FIG. 4B illustrates another 50 differential internal termination. FIG. 4C illustrates 50 or a 150 ohm differential internal termination.

Figure 5:
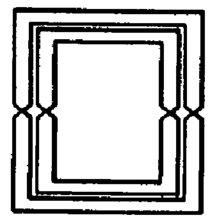
FIG. 5 illustrates an inductor that can be used in the peaking circuit 200.
Figure 5:
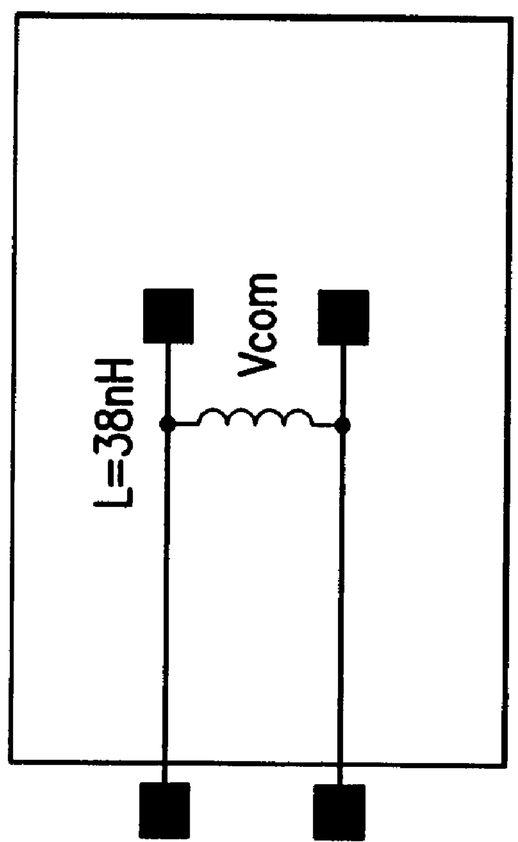

FIG. 5 illustrates an inductor that can be used in the peaking circuit 200.

Figure 6:
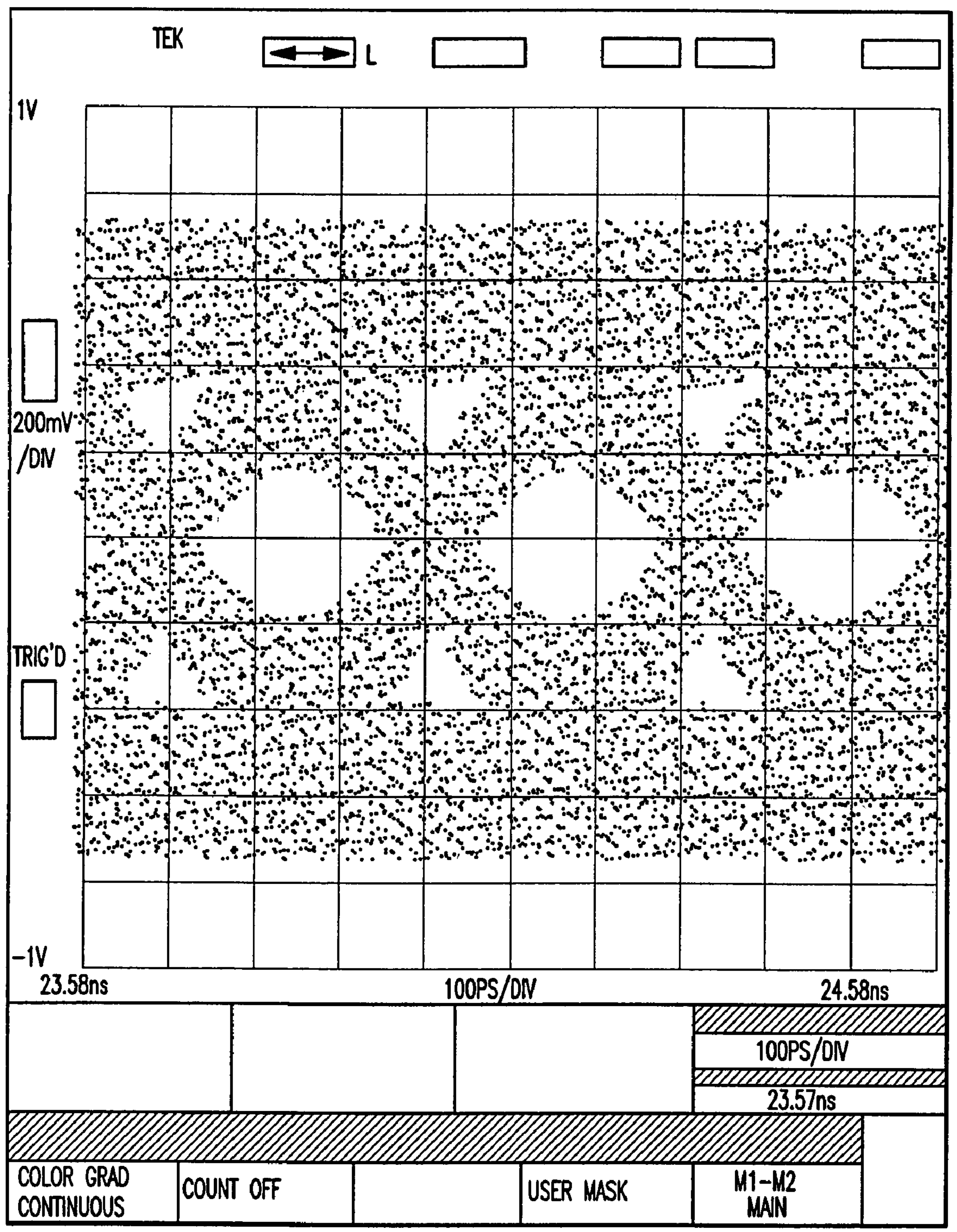
Figures 1, 6:
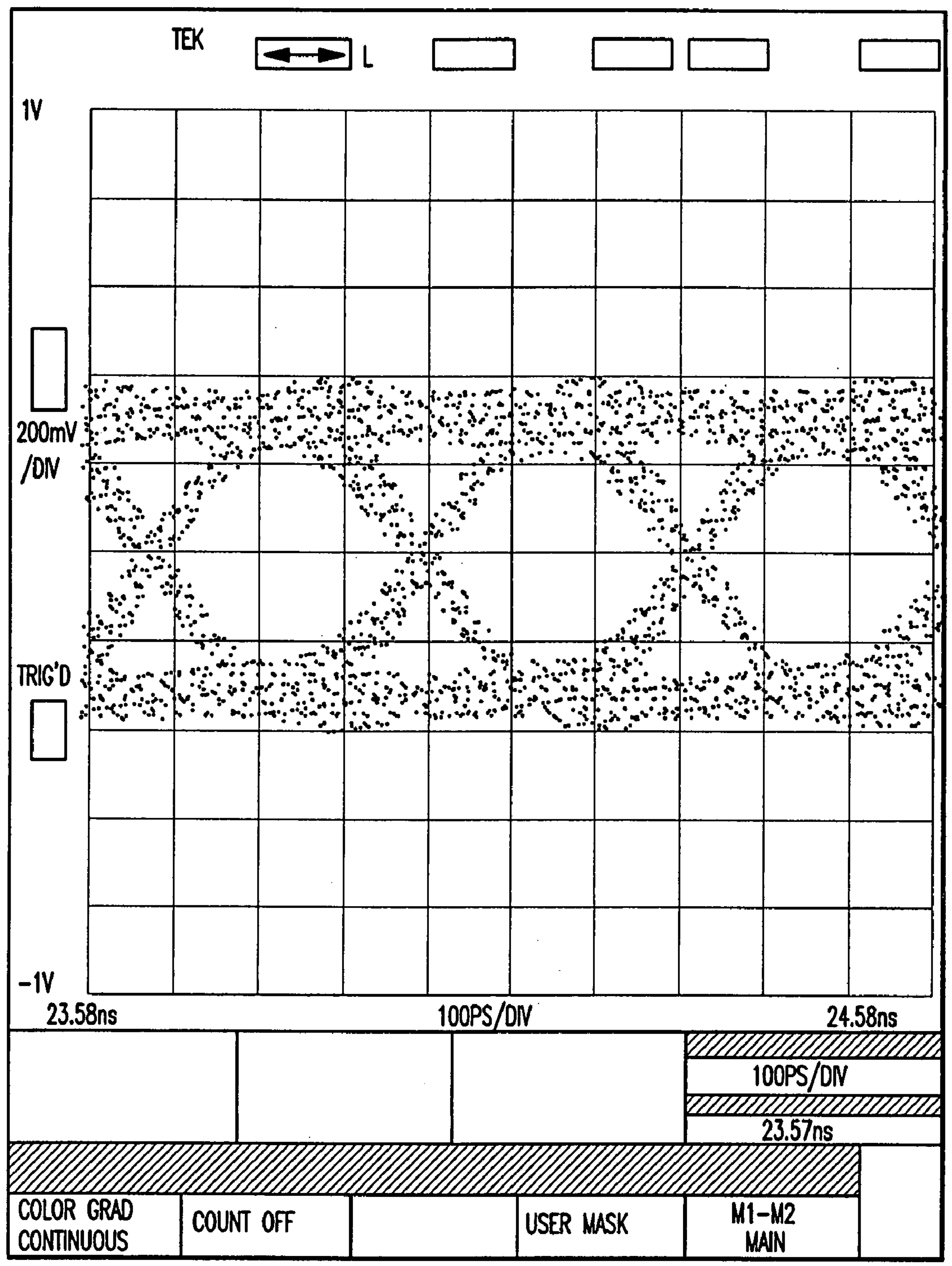
Figures 2, 6:
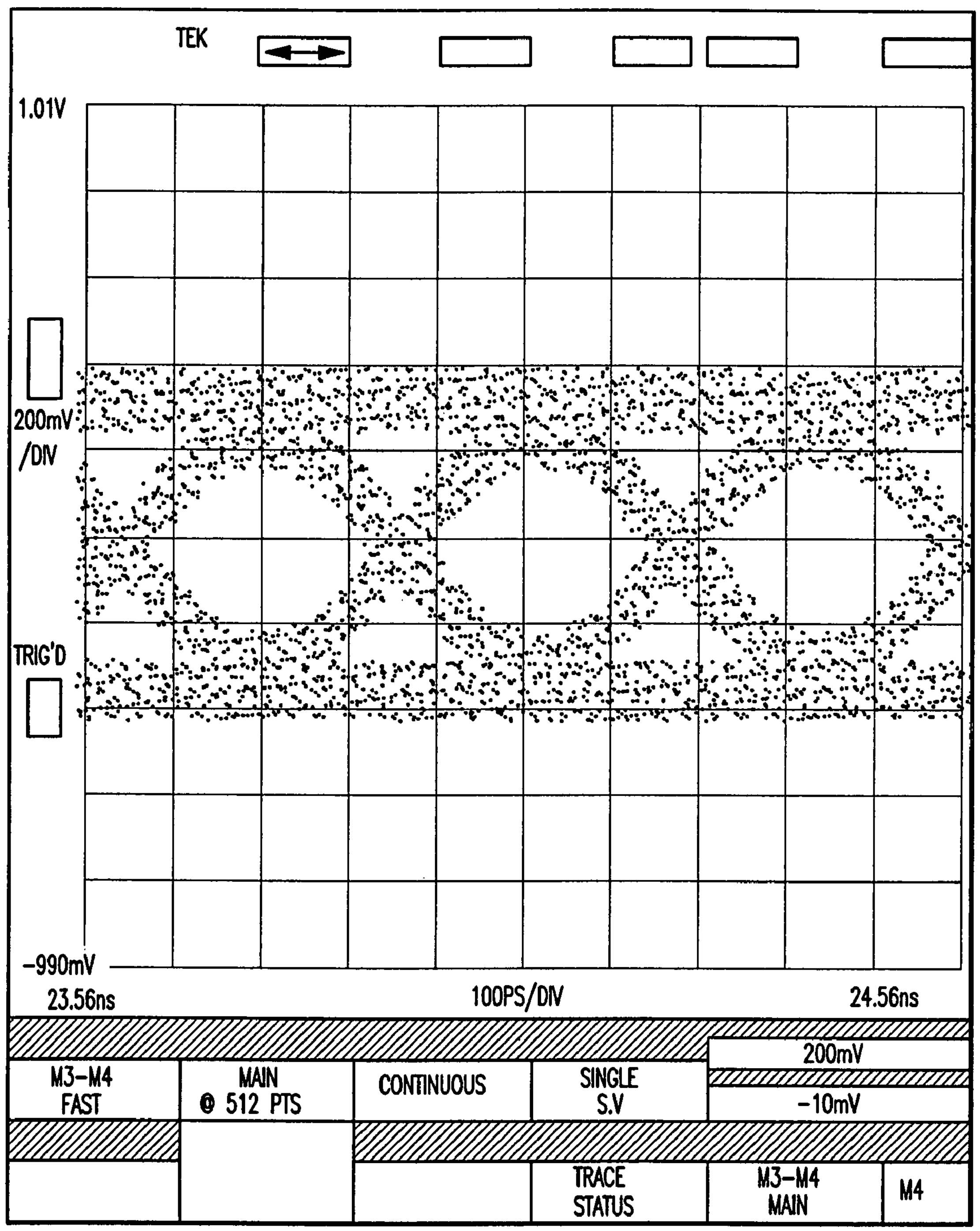

FIGS. 6, 6-1, and 6-2 illustrate the eye diagram at the receiver comparing no de-emphasis in FIG. 6 vs with de-emphasis in FIG. 6-1, and an external equalizer in FIG. 6-2. The improvement in bit error rate is apparent using the de-emphasis.

Figure 7:
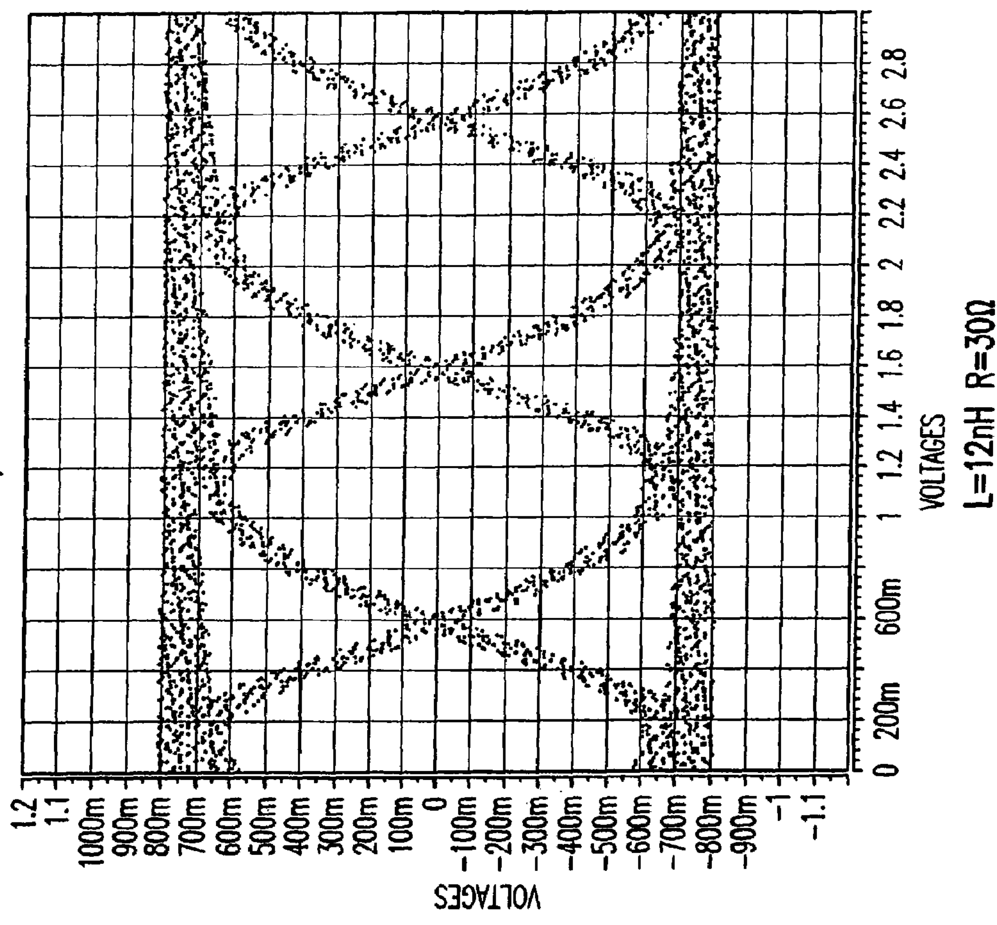
Figures 1, 7:
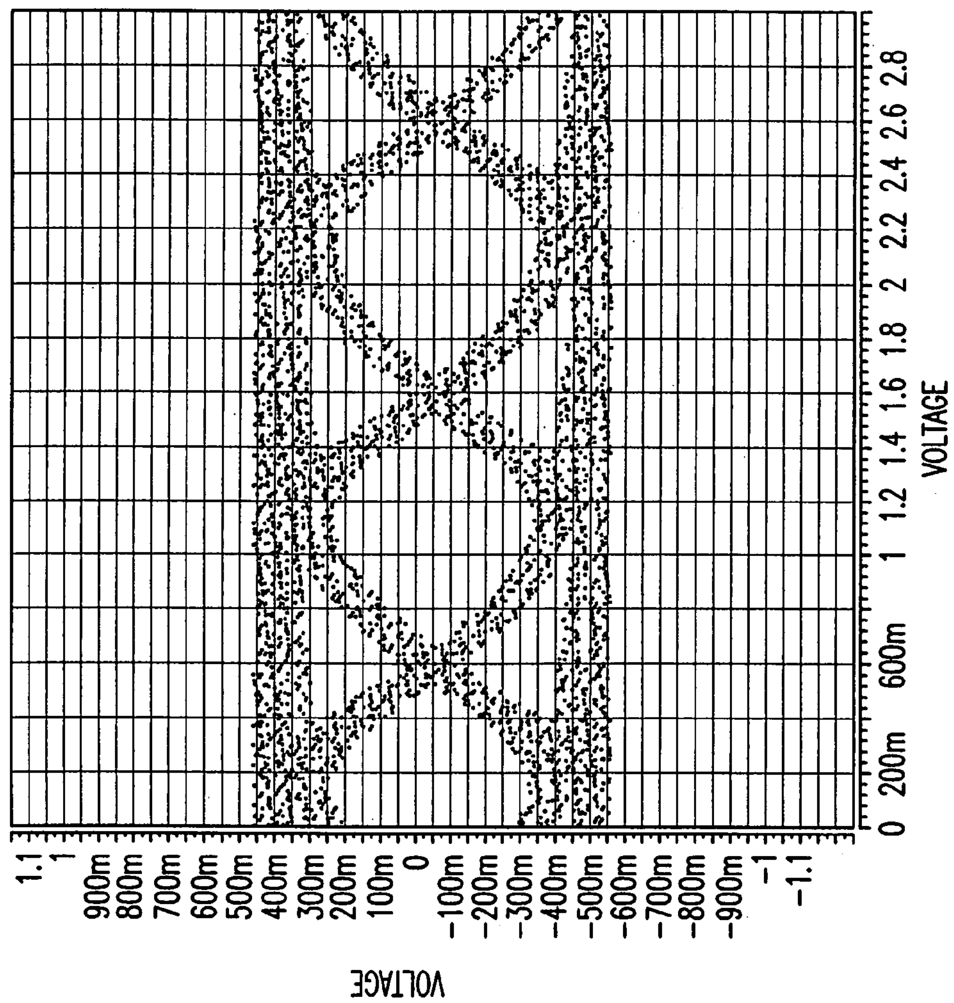

FIGS. 7 and 7-1 illustrate the eye diagrams when using de-emphasis versus a passive receiver equalizer.

Figure 8:
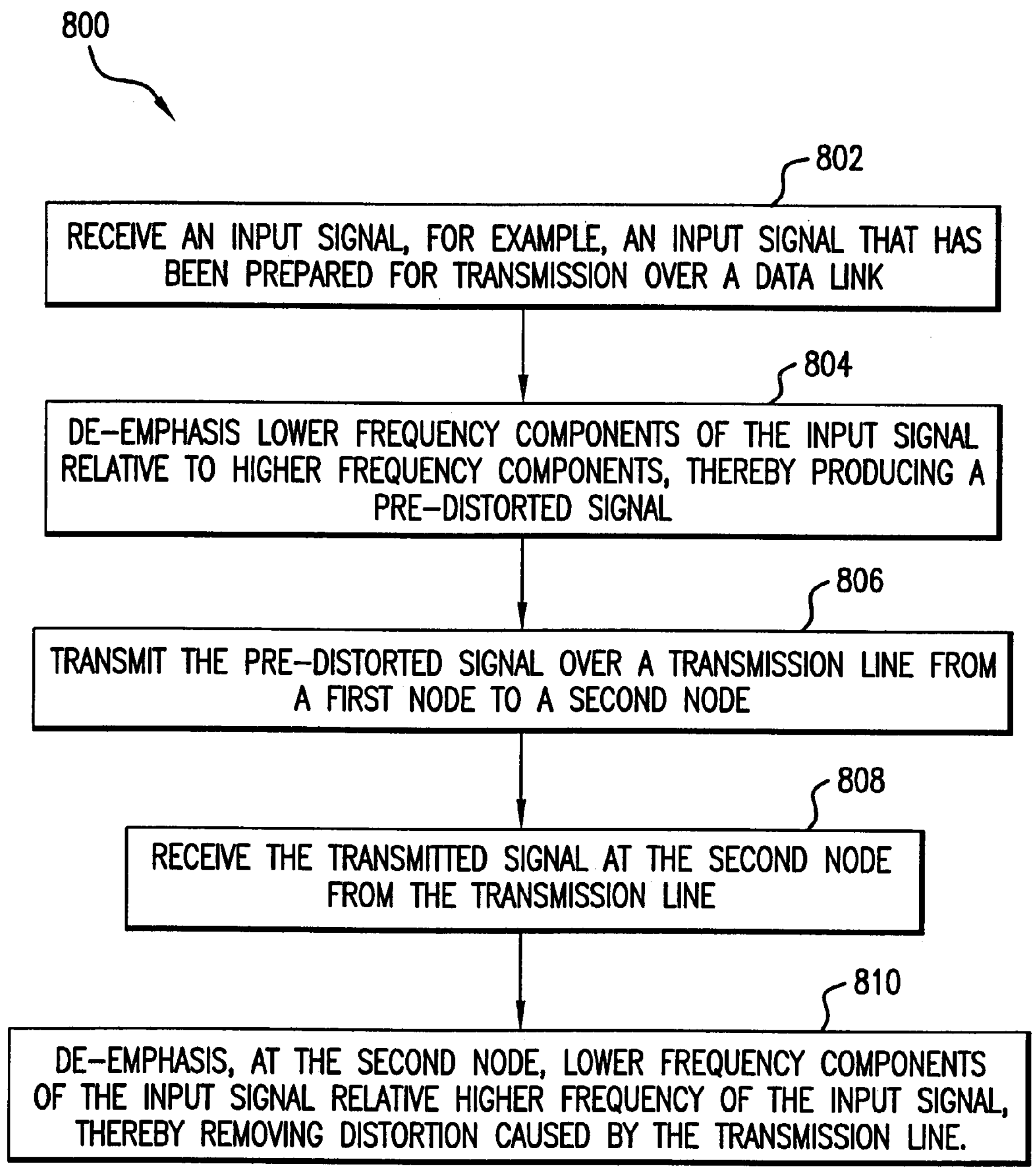
FIG. 8 illustrates a flowchart that further defines the invention.

FIG. 8 illustrates a flowchart 800 that further describes transmitter de-emphasis and receiver equalization according to embodiments of the present invention.

In step 802, an input signal is received that has been prepared for transmission over a data link. For instance, the input signal can be a serialized data signal that has been converted by a serializer/de-serializer for transmission over the data link.

In step 804, the input signal is processed to de-emphasizes lower frequency components of the input signal relative to higher frequency components in the input signal, thereby producing a predistorted signal for transmission. For instance, the amplitude of the lower frequency signal components can be reduced while the amplitude of the higher frequency signal components remain unchanged. In other words, the step 804 provides transmitter equalization.

In step 806, the pre-distorted signal from step 804 is transmitted over a transmission line, and is received at the output of the transmission line in step 808.

In step 810, the received signal is processed at the output of the transmission line so as to further reduce the amplitude of the lower frequency signal components relative to the higher frequency signal components, thereby flattening the amplitude of the received signal across frequency and removing distortion caused by the transmission line. In other words, step 810 provides receiver equalization.

Figure 9:
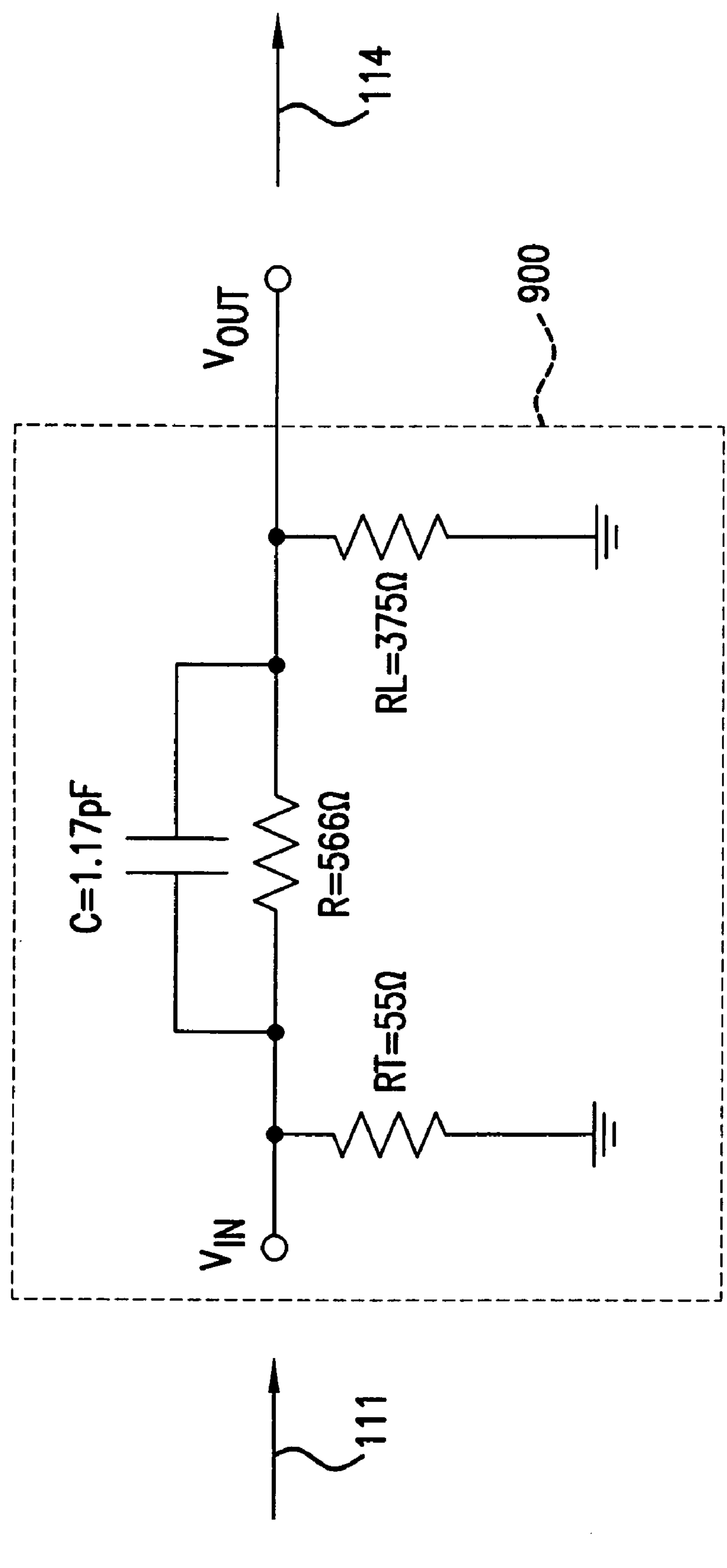
FIG. 9 illustrates a RC filter embodiment for the receiver equalizer.

FIG. 9 illustrates an RC filter 900 that is another embodiment of the passive equalizer 112. The RC filter 900 has a high pass response that provides a nearly constant input and output impedance across frequency, where the reflection coefficient depends on R. The component values shown for the RC filter 900 are shown for example purposes only and are not meant to be limiting, as other component values could be used. Other filter configurations, including other constant impedance filters, can be used for the passive equalizer 112 as will be understood by those skilled in the arts, based on the discussion give herein.

Conclusion

Example embodiments of the methods, systems, and components of the present invention have been described herein. As noted elsewhere, these example embodiments have been described for illustrative purposes only, and are not limiting. Other embodiments are possible and are covered by the invention. Such other embodiments will be apparent to persons skilled in the relevant art(s) based on the teachings contained herein. Thus, the breadth and scope of the present invention should not be limited by any of the above-described exemplary embodiments, but should be defined only in accordance with the following claims and their equivalents.

What is claimed is:

1. A data link system configured to operate with a differential transmission line having a differential input and a differential output, the data link system comprising:

a transmitter de-emphasis circuit coupled to said input of said differential transmission line, said transmitter de-emphasis circuit including, a first transconductance device having a fixed gain;

a second transconductance device, coupled in parallel with said first transconductance device, and having a variable gain; and a summer device for summing current outputs of said first and second transconductance devices; and an equalizer coupled to said differential output of said differential transmission line, said equalizer having an inductor connected between first and second transmission lines forming said differential transmission line.

2. The data link system of claim 1, wherein said transmitter de-emphasis circuit pre-distorts said differential transmission line input to compensate for frequency distortion caused by said differential transmission line.

3. The data link system of claim 1, wherein said transmitter de-emphasis circuit has a gain that increases with frequency across a frequency band of interest.

4. The data link system of claim 1, wherein a signal loss of said differential transmission line increases with frequency, and wherein said transmitter de-emphasis circuit has a gain that increases with frequency to offset said signal loss of said differential transmission line.

5. The data link system of claim 1, wherein said equalizer is a passive equalizer.

6. The data link system of claim 1, wherein said transmitter de-emphasis circuit reduces an amplitude of low frequency components in an input signal.

7. The data link system of claim 1, wherein said differential transmission line is one of a coaxial cable, an optical fiber, and a twisted pair.

8. The data link system of claim 1, wherein said equalizer includes a resistor connected in-series with said inductor between said first and second transmission lines forming said differential transmission line.

9. The data link system of claim 1, wherein said equalizer is a filter network having a nearly constant impedance.

10. The data link system of claim 1, wherein said equalizer is a RC filter.

11. The data link system of claim 10, wherein said RC filter has a highpass response.

12. The data link system of claim 10, wherein said RC filter has a nearly constant input impedance.

* * * * *

UNITED STATES PATENT AND TRADEMARK OFFICE

CERTIFICATE OF CORRECTION

PATENT NO. : 7,586,987 B2
APPLICATION NO. : 10/680490
DATED : September 8, 2009
INVENTOR(S) : Vorenkamp et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 964 days.

Signed and Sealed this

Twenty-first Day of September, 2010

David J. Kappos

*Director of the United States Patent and Trademark Office*